US012154742B2

(12) United States Patent
Kawase et al.

(10) Patent No.: US 12,154,742 B2
(45) Date of Patent: Nov. 26, 2024

(54) FUSE

(71) Applicant: Pacific Engineering Corporation, Gifu (JP)

(72) Inventors: Fumiyuki Kawase, Gifu (JP); Jyunhyoku Yang, Gifu (JP); Keisuke Ohta, Gifu (JP); Ryohei Hayase, Gifu (JP); Hiroshi Nakamura, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 177 days.

(21) Appl. No.: 17/926,888

(22) PCT Filed: Jul. 16, 2021

(86) PCT No.: PCT/JP2021/026745
§ 371 (c)(1),
(2) Date: Nov. 21, 2022

(87) PCT Pub. No.: WO2022/054404
PCT Pub. Date: Mar. 17, 2022

(65) Prior Publication Data

US 2023/0215675 A1 Jul. 6, 2023

(30) Foreign Application Priority Data

Sep. 9, 2020 (JP) ................................ 2020-151005

(51) Int. Cl.
*H01H 85/11* (2006.01)
*H01H 85/147* (2006.01)

(52) U.S. Cl.
CPC .......... *H01H 85/11* (2013.01); *H01H 85/147* (2013.01)

(58) Field of Classification Search
CPC ...... H01H 85/11; H01H 85/147; H01H 69/02; H01H 2085/025; H01H 2085/0555; H01H 85/175; H01H 85/08
(Continued)

(56) References Cited

U.S. PATENT DOCUMENTS

2016/0005563 A1* 1/2016 Fukunaga .............. H01H 69/02 337/186

FOREIGN PATENT DOCUMENTS

CN 103415906 A * 11/2013 ............. H01H 69/02
JP 2007-80709 3/2007
(Continued)

OTHER PUBLICATIONS

Takuchi, Naoto; Title: Method for forming fuse wire circuit of bus bar, fuse, and fuse; CN 103415906; Entire specification and drawings (Year: 2012).*

(Continued)

*Primary Examiner* — Dharti H Patel
(74) *Attorney, Agent, or Firm* — Lowe Graham Jones PLLC

(57) ABSTRACT

The present invention provides a fuse that can be easily manufactured and has an improved yield. A fuse includes an input terminal portion, a bus bar portion through which a current input from the input terminal portion flows, and a terminal portion connected to the bus bar portion through a fusible portion, where a fusible portion unit including the fusible portion and the terminal portion is provided in plurals, each of the fusible portion units is a separate body from the bus bar portion and is individually attached to the bus bar portion.

3 Claims, 7 Drawing Sheets

(58) Field of Classification Search
USPC .......................................................... 361/103
See application file for complete search history.

(56) References Cited

FOREIGN PATENT DOCUMENTS

| | | | | |
|---|---|---|---|---|
| JP | 2011-253679 | | 12/2011 | |
| JP | 2014-182952 | | 9/2014 | |
| JP | 2015-22866 | | 2/2015 | |
| KR | 10-2016-0081061 | | 7/2016 | |
| WO | WO-0243097 | A1 * | 5/2002 | ......... H01H 85/0417 |
| WO | WO-2011086995 | A1 * | 7/2011 | ......... H01H 85/0078 |
| WO | WO-2014123168 | A1 * | 8/2014 | ............. H01H 69/02 |

OTHER PUBLICATIONS

International Search Report (with English translation) and Written Opinion of the International Searching Authority, dated Sep. 14, 2021, in International Patent Application No. PCT/JP21/26745, 8 pages.

* cited by examiner

FUSE

PRIORITY CLAIM

This application is a U.S. national phase of International Patent Application No. PCT/JP2021/026745 filed Jul. 16, 2021; which claims the benefit of priority from Japan Patent Application No. 2020-151005 filed Sep. 9, 2020, the contents of which are incorporated by reference.

FIELD OF THE INVENTION

The present invention relates to a fuse mainly used for an automobile electric circuit or the like, and more particularly to a fuse including a plurality of terminal portions.

BACKGROUND OF THE INVENTION

Conventionally, fuses have been used to protect an electric circuit mounted on an automobile or the like and various electrical components connected to the electric circuit. Specifically, when an unintended overcurrent flows in the electric circuit, a fusing portion built in the fuse fuses by heat generated by the overcurrent, so that an excessive current does not flow through various electrical components.

There are various types of fuses depending on the application, and for example, a fuse described in Patent Literature 1 is known. As illustrated in FIG. 7, a conventional fuse 900 as shown in Patent Literature 1 includes an input terminal 910, a bus bar portion 920 through which a current input from the input terminal 910 flows, and a terminal portion 940 connected to the bus bar portion 920 through a fusible portion 930. The fuse 900 includes a plurality of fusible portions 930 and terminal portions 940, and connection terminals and the like connected to various electrical components can be coupled to the terminal portions 940. The bus bar portion 920, the fusible portion 930, and the terminal portion 940 are integrally formed by punching one conductive metal plate into a shape as illustrated in FIG. 7. The rating of the fusible portion 930 is appropriately changed by changing the shape or the like of each fusible portion 930 according to the specification. However, in a case where the shape of each fusible portion 930 is changed according to the rating, the entire configuration including the other integrally formed fusible portions 930 and the bus bar portion 920 needs to be redesigned, and there is a problem that design and manufacturing are troublesome and a manufacturing period becomes long. In addition, when the fusible portions 930 having various shapes according to the rating are integrally formed by punching from one metal plate together with the other fusible portions 930 and the bus bar portion 920, the yield deteriorates as a whole.

CITATIONS LIST

Patent Literature

Patent Literature 1: JP 2015-22866 A

SUMMARY OF THE INVENTION

Technical Problems

Therefore, the present invention provides a fuse that can be easily manufactured and has an improved yield.

Solutions to Problems

In order to solve the above problems, a fuse according to the present invention includes an input terminal portion, a bus bar portion through which a current input from the input terminal portion flows, and a terminal portion connected to the bus bar portion through a fusible portion, where a fusible portion unit including the fusible portion and the terminal portion is provided in plurals, and each of the fusible portion unit is a separate body from the bus bar portion and is individually attached to the bus bar portion.

According to the above feature, when the rating of the fusible portion is changed, a desired fuse can be easily manufactured in a short period of time by simply preparing fusible portion units with different ratings and attaching the fusible portion units to the bus bar portion. In addition, even in a case complying with a wide variety of specifications required for a fuse (e.g., a change in the number and size of the terminal portions, a change in the shape of the bus bar portion, etc.), it can be easily manufactured in a short period of time by merely individually changing the fusible portion unit and the bus bar portion. Furthermore, by manufacturing the fusible portion unit including the fusible portion whose shape is changed as a separate body from the bus bar portion, the fusible portion unit and the bus bar portion can be individually designed to optimal shapes, respectively, and the yield is improved as a whole.

Furthermore, in the fuse according to the present invention, the fusible portion of the fusible portion unit extends in a height direction connecting the terminal portion and the bus bar portion, and a part of the fusible portion is bent so as to contract in the height direction and protrude from a surface of the bus bar portion.

According to the above feature, since the fusible portion is configured to contract in the height direction as a whole, the size in the height direction can be prevented from increasing even if the rating is changed. Furthermore, even if the plurality of fuses 700 are lined in a fuse box or the like, a part of the fusible portion is bent so as to protrude from the surface of the bus bar portion, so that the fusible portion can be visually confirmed from an upward or obliquely upward viewpoint, and thus whether or not the fusible portion has fused can be easily confirmed.

Furthermore, in the fuse according to the present invention, the fusible portion unit includes a housing that accommodates the fusible portion, the housing protrudes from a surface of the bus bar portion, and a viewing window through which the fusible portion inside can be viewed is formed on an upper surface wall of the housing.

According to the above feature, whether or not the fusible portion has fused can be easily confirmed from above through the viewing window of the upper surface wall of the housing.

Furthermore, in the fuse according to the present invention, the viewing window extends from an upper surface wall to a front surface wall of the housing.

According to the above feature, whether or not the fusible portion has fused can be easily confirmed through the viewing window even from the upward direction and obliquely upper side.

Advantageous Effects of Invention

As described above, according to the fuse of the present invention, the fuse can be easily manufactured, and the yield can be improved.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Reference Signs List

Figure 1A:
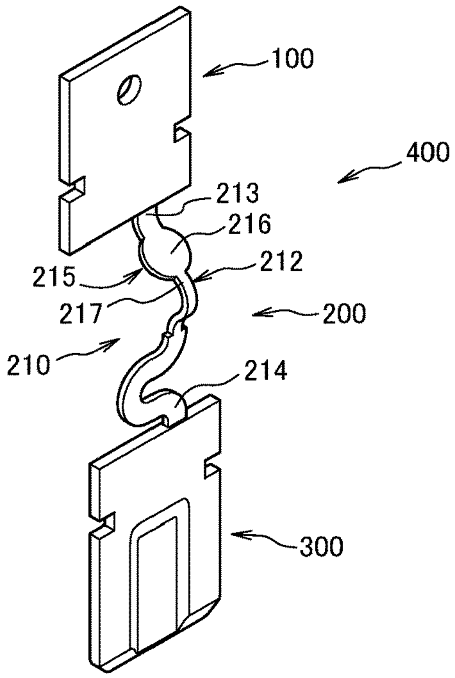
FIG. 1(*a*) is an overall perspective view of a fusible portion unit of a fuse according to the present invention, FIG. 1(*b*) is a front view of the fusible portion unit, and FIG. 1(*c*) is a side view of the fusible portion unit.

200 fusible portion
300 terminal portion
400 fusible portion unit
600 bus bar portion
610 input terminal portion
700 fuse

Description of Embodiment

Hereinafter, an embodiment of the present invention will be described with reference to the drawings. The shape, material, and the like of each member of a fuse in the embodiment described below are merely examples, and are not limited thereto.

Figure 1B:
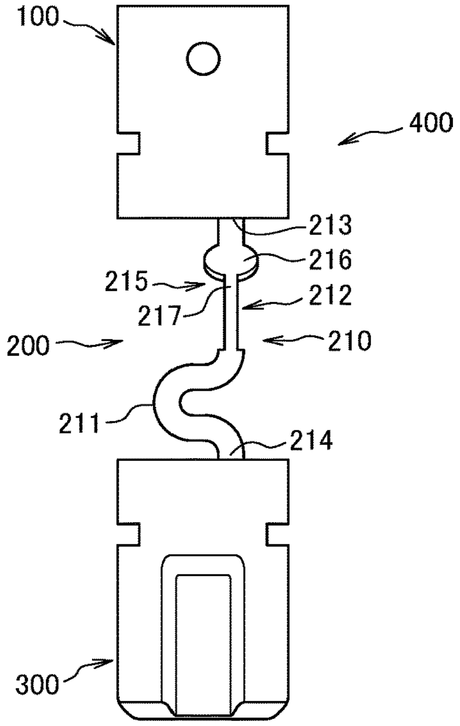
Figure 1C:
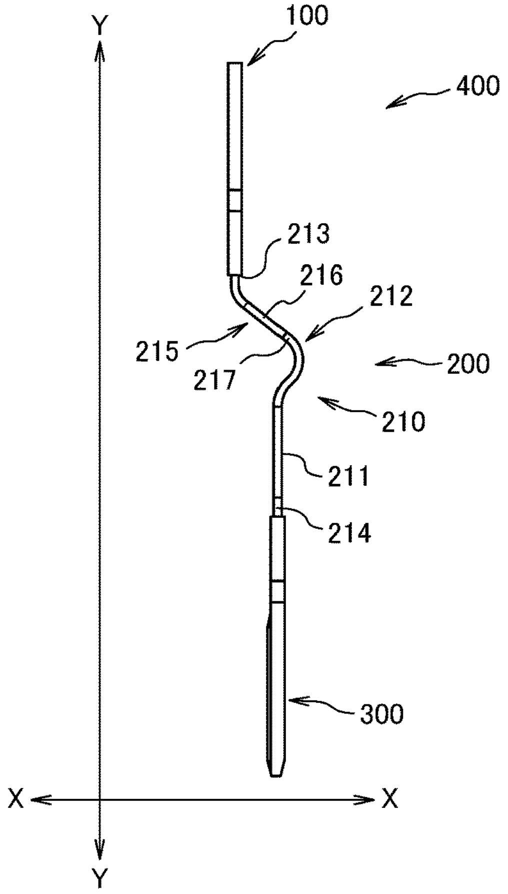

FIG. 1 illustrates a fusible portion unit 400 of the fuse according to the present invention. FIG. 1(*a*) is an overall perspective view of the fusible portion unit 400, FIG. 1(*b*) is a front view of the fusible portion unit 400, and FIG. 1(*c*) is a side view of the fusible portion unit 400.

As illustrated in FIG. 1, the fusible portion unit 400 includes a coupling portion 100 that is connected and fixed to a bus bar portion described later, a fusible portion 200, and a terminal portion 300 that couples connection terminals and the like connected to various electrical components. The coupling portion 100, the fusible portion 200, and the terminal portion 300 are integrally formed by punching a flat plate material having a uniform thickness made of a conductive metal such as copper or an alloy thereof into a shape as illustrated in FIG. 1 with a press machine or the like. The coupling portion 100 has a flat plate shape to be fixed to a flat plate-shaped bus bar portion by welding or the like. The terminal portion 300 has a flat plate shape so as to be coupled to an external connection terminal.

Furthermore, the shape of the fusible portion 200 is appropriately designed in order to realize a resistance value according to the rating. Specifically, in the fusible portion 200, the length of a linear body 210 which is narrower than the coupling portion 100 and the terminal portion 300 and extends in a long shape is appropriately changed according to the rating. For example, when the rating of the fusible portion 200 decreases, the entire length of the linear body 210 is increased to increase the resistance value of the fusible portion 200. The linear body 210 extends in the height direction Y connecting the bus bar portion to which the coupling portion 100 is connected and fixed and the terminal portion 300 (alternatively, height direction Y connecting the coupling portion 100 and the terminal portion 300). When the entire length of the fusible portion 200 is long, the size of the fusible portion 200 in the height direction Y is prevented from increasing by forming a U-shaped portion 211 in which a part of the linear body 210 is bent to a U-shape or the like.

As illustrated in FIG. 1(*c*), a bent curved portion 212 is formed such that a part of the linear body 210 of the fusible portion 200 contracts in the height direction Y and protrudes from the surface of the bus bar portion to which the coupling portion 100 is connected and fixed (or the surface of the coupling portion 100). The curved portion 212 protrudes so as to curve in the direction X orthogonal to the height direction Y. In addition, with the formation of the curved portion 212, the distance between an upper end 213 at which the linear body 210 is connected to the coupling portion 100 and a lower end 214 at which the linear body 210 is connected to the terminal portion 300 in the height direction Y is shorter than that in a case where the linear body 210 of the fusible portion 200 extends linearly in the height direction Y as in the related art. Furthermore, when the linear body 210 extends linearly in the height direction Y as in the related art, the upper end 213 and the lower end 214 are arranged linearly in the height direction Y, but as the curved portion 212 is formed, the upper end 213 and the lower end 214 are not arranged linearly in the height direction Y, but are arranged shifted from each other in the direction X orthogonal to the height direction Y. As described above, the fusible portion 200 is bent so as to contract in the height direction Y as a whole and protrude from the surface of the bus bar portion to which the coupling portion 100 is connected and fixed (or the surface of the coupling portion 100), in other words, so as to be shifted in the direction X orthogonal to the height direction Y. Since the fusible portion 200 is configured to contract in the height direction Y as a whole, the size in the height direction Y can be prevented from increasing even if the rating is changed and the entire length of the fusible portion 200 is lengthened.

Furthermore, the curved portion 212 includes an inclined portion 215 inclined obliquely downward from the coupling portion 100 toward the terminal portion 300, and a welding portion 216 for welding a low melting point metal (not illustrated) made of tin, silver, lead, nickel, an alloy thereof, or the like is provided in a part of the inclined portion 215. When an unintended overcurrent flows in the fusible portion 200, the low melting point metal welded on the welding portion 216 melts and moves downward along the inclined portion 215. Then, the moving low melting point metal is bonded to the connecting portion 217 continuing to the lower side of the welding portion 216, the melting point of the connecting portion 217 is lowered, and the connecting portion 217 of the fusible portion 200 is more quickly and effectively fused.

Note that the fusible portion 200 includes one curved portion 212, but is not limited thereto, and two or more curved portions 212 may be provided to lengthen the entire length of the linear body 210. Furthermore, the fusible portion 200 is not limited to the configuration as illustrated in FIG. 1, and may have any other configuration as long as it has a configuration in which a part of the fusible portion 200 is extended in the height direction Y and is further bent so as to contract in the height direction Y and so as to protrude from the surface of the bus bar portion to which the coupling portion 100 is connected and fixed (or the surface of the coupling portion 100). Furthermore, the fusible portion 200 includes the linear body 210 having a narrowed width that is fused due to heat generation when an unintended overcurrent flows in the electric circuit or the like to cut off an overcurrent, but is not limited thereto, and an arbitrary configuration can be adopted as long as the overcurrent can be cut off by generating heat and fusing when an unintended overcurrent flows in the electric circuit or the like, such as providing a small hole in a part of the fusible portion 200 and fusing a portion having a narrowed width.

Figure 2A:
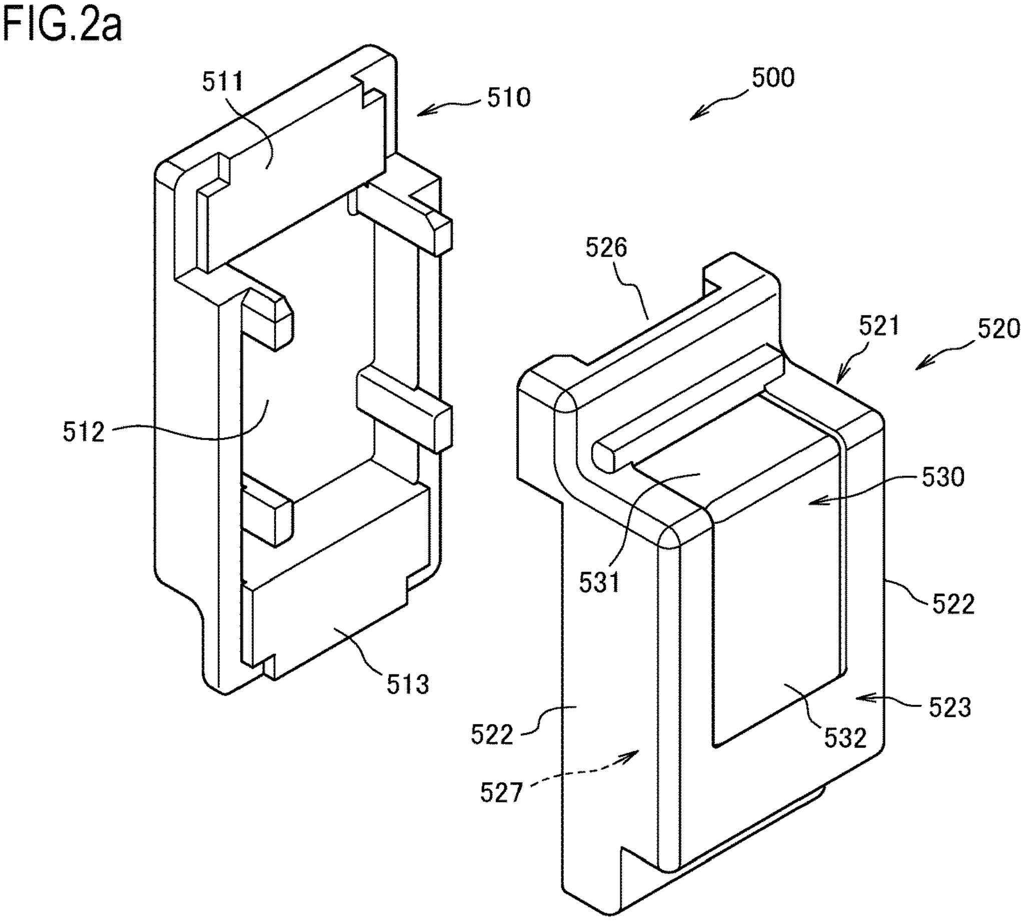
FIG. 2(*a*) is an exploded perspective view of a housing attached to the fusible portion unit, FIG. 2(*b*) is a side view of the housing, and FIG. 2(*c*) is a front view of the housing.
Figure 2B:
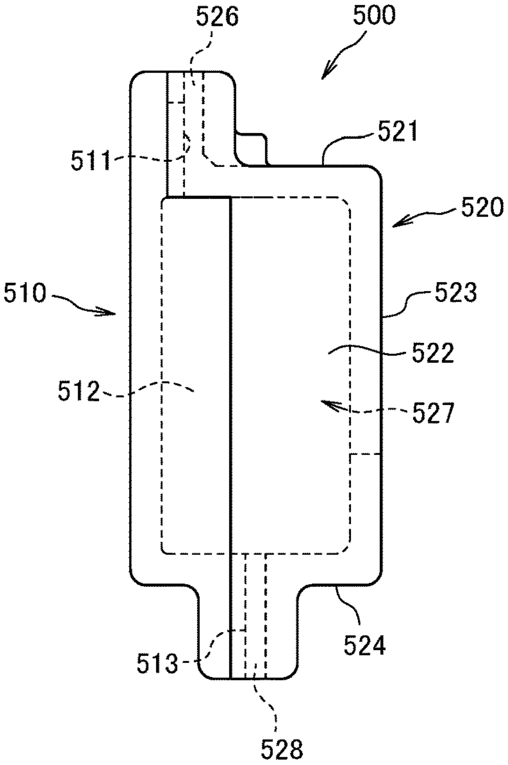
Figure 2C:
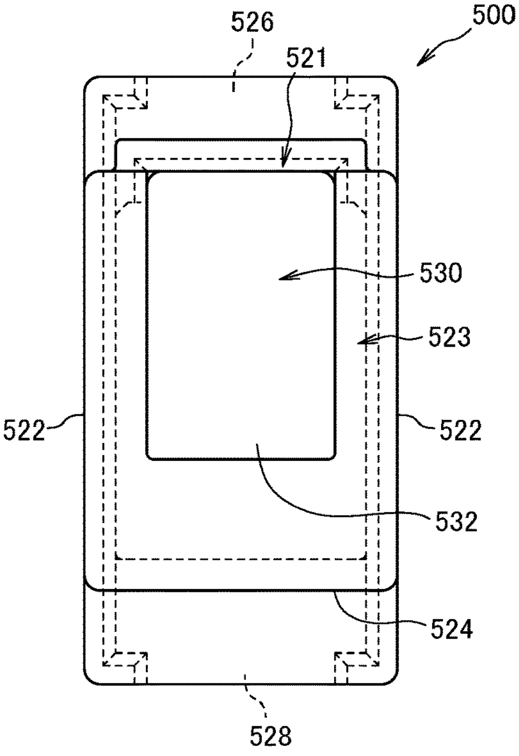

Next, a housing 500 attached to the fusible portion unit 400 will be described. The housing 500 accommodates and protects the fusible portion 200 of the fusible portion unit 400 so that the fusible portion 200 is not exposed to an external environment. FIG. 2(*a*) is an exploded perspective view of the housing 500, FIG. 2(*b*) is a side view of the housing 500, and FIG. 2(*c*) is a front view of the housing 500.

The housing 500 is made of insulating synthetic resin or the like, and includes a pair of rear surface side divided body 510 and front surface side divided body 520. The rear surface side divided body 510 has a substantially rectangular parallelepiped shape, and includes an upper end portion 511 in which the coupling portion 100 of the fusible portion unit 400 can be arranged, a recessed portion 512 covering the fusible portion 200 of the fusible portion unit 400, and a lower end portion 513 in which the terminal portion 300 of the fusible portion unit 400 can be arranged. The front surface side divided body 520 includes an upper surface wall 521, side surface walls 522 on both sides, a front surface wall 523, and a lower surface wall 524, and has a substantially rectangular parallelepiped shape with a hollow inside. An upper end hole 526 through which the coupling portion 100 of the fusible portion unit 400 can be inserted is provided on the upper surface wall 521 side, an accommodation space 527 that accommodates the fusible portion 200 of the fusible portion unit 400 is provided on the inner side of the front surface wall 523, and a lower end hole 528 through which the terminal portion 300 of the fusible portion unit 400 can be inserted is provided on the lower surface wall 524 side.

Furthermore, the front surface side divided body 520 has a viewing window 530 made of transparent or translucent synthetic resin or the like. The viewing window 530 includes an upper end window 531 formed in the upper surface wall 521 and a front window 532 formed in the front surface wall 523. Note that the viewing window 530 is made of a transparent or translucent synthetic resin, but may be made of any material as long as the fusible portion 200 accommodated in the housing 500 can be visually recognized. The viewing window 530 includes the upper end window 531 and the front window 532, but is not limited thereto, and may include only the upper end window 531 without the front window 532.

Figure 3A:
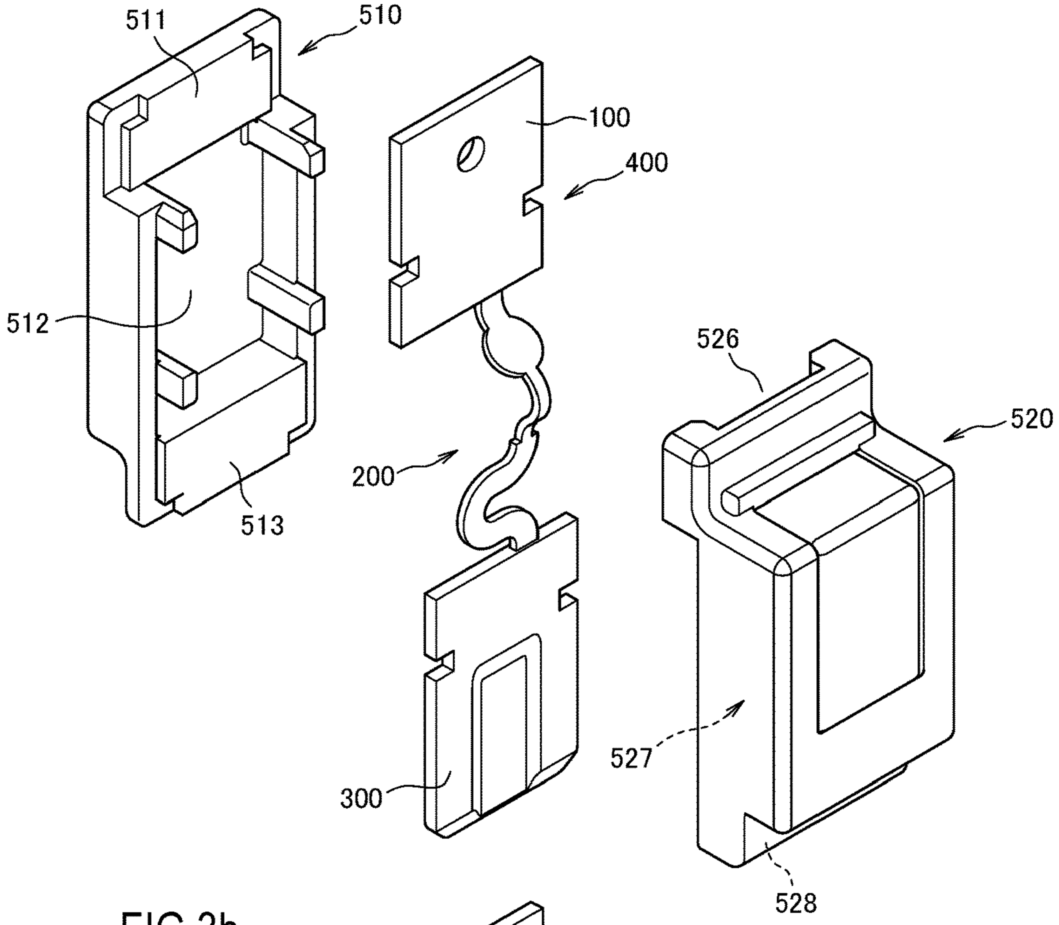
FIG. 3(*a*) is an overall perspective view illustrating a state in which a housing is assembled to the fusible portion unit, and FIG. 3(*b*) is an overall perspective view illustrating a state in which the housing is assembled to the fusible portion unit.
Figure 3B:
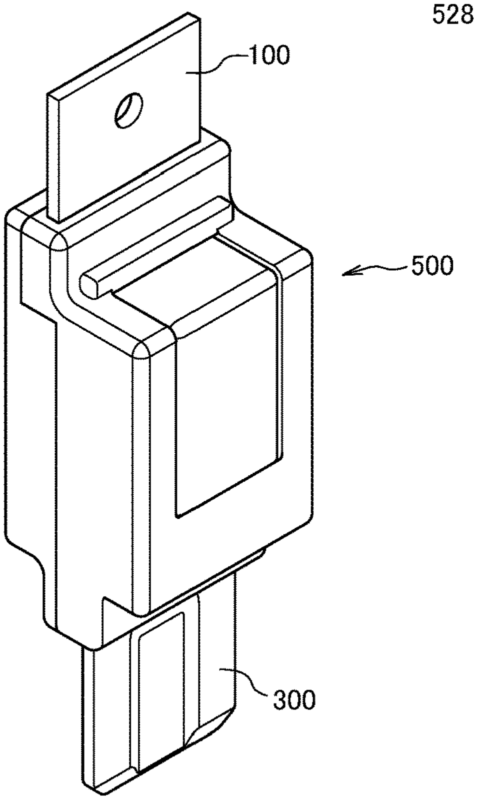

Next, a manner in which the housing 500 is assembled to the fusible portion unit 400 will be described with reference to FIGS. 3 and 4. FIG. 3(*a*) is an overall perspective view illustrating a state in which the housing 500 is to be assembled to the fusible portion unit 400, FIG. 3(*b*) is an overall perspective view illustrating a state in which the housing 500 has been assembled to the fusible portion unit 400, FIG. 4(*a*) is a front view illustrating a state in which the housing 500 has been assembled to the fusible portion unit 400, FIG. 4(*b*) is a side view of the state, and FIG. 4(*c*) is a plan view of the state.

As illustrated in FIG. 3, the rear surface side divided body 510 of the housing 500 is provided from the rear surface side of the fusible portion unit 400, and the front surface side divided body 520 of the housing 500 is provided from the front surface side of the fusible portion unit 400, so that the housing 500 is attached so as to sandwich the fusible portion unit 400 from the rear surface side and the front surface side of the fusible portion unit 400. Specifically, the coupling portion 100 of the fusible portion unit 400 is provided to the upper end portion 511 of the rear surface side divided body 510 and attached so as to be sandwiched by the upper end hole 526 of the front surface side divided body 520, whereby the coupling portion 100 is assembled in a state of protruding from the upper end side of the housing 500. Furthermore, by covering the rear surface side of the fusible portion 200 of the fusible portion unit 400 with the recessed portion 512 of the rear surface side divided body 510 and attaching the front surface side of the fusible portion 200 so as to be covered with the accommodation space 527 of the front surface side divided body 520, the fusible portion 200 is assembled in a state of being accommodated in the housing 500. Furthermore, by providing the terminal portion 300 of the fusible portion unit 400 to the lower end portion 513 of the rear surface side divided body 510 and attaching so as to be sandwiched by the lower end hole 528 of the front surface side divided body 520, the terminal portion 300 is assembled in a state of protruding from the lower end side of the housing 500.

Figure 4A:
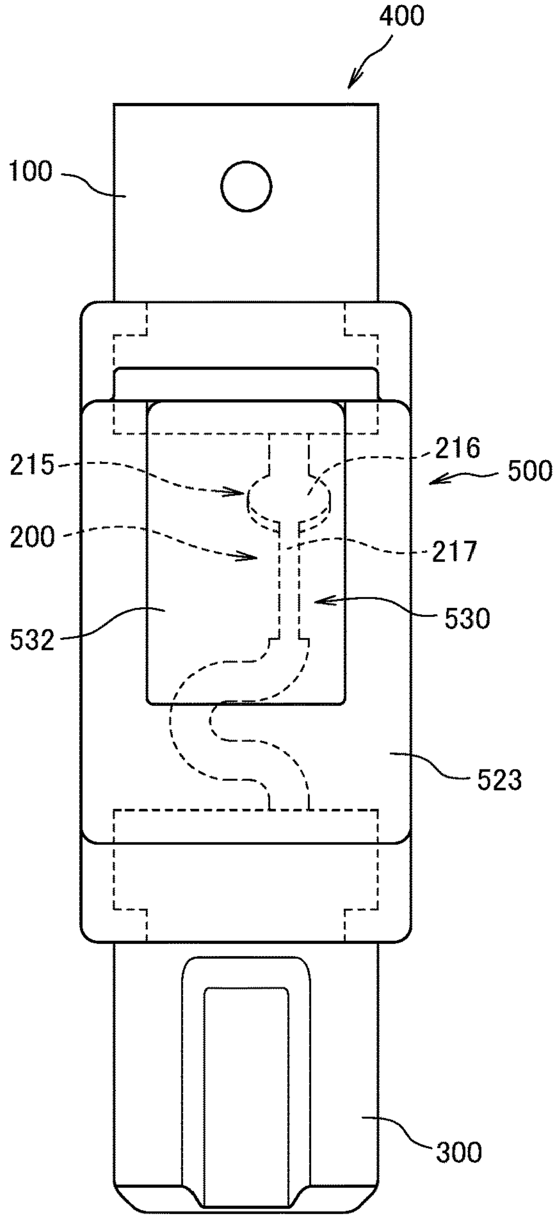
FIG. 4(*a*) is a front view of a state in which the housing is assembled to the fusible portion unit, FIG. 4(*b*) is a side view of the state, and FIG. 4(*c*) is a plan view of the state.
Figure 4B:
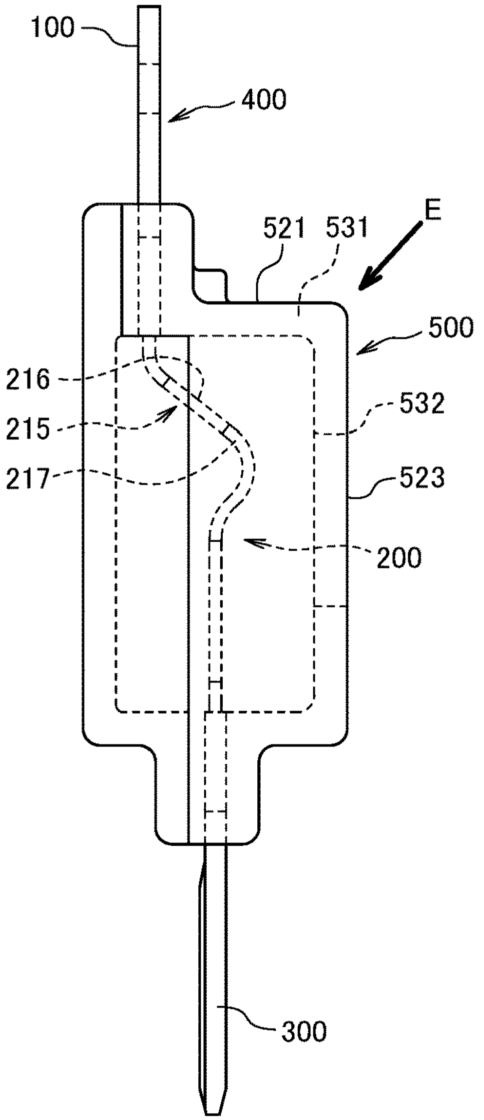
Figure 4C:
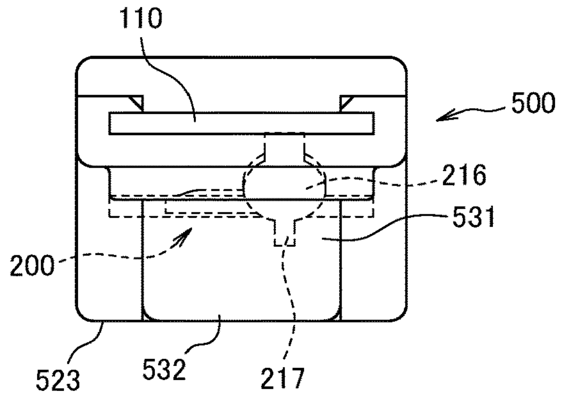

Then, as illustrated in FIG. 4, in a state where the housing 500 is attached to the fusible portion unit 400, the fusible portion 200 is accommodated in the housing 500, and the fusible portion 200 in the housing 500 can be visually recognized from the upper end window 531 of the viewing window 530. The fusible portion 200 in the housing 500 can also be visually recognized from the front window 532 of the viewing window 530. Since the upper end window 531 and the front window 532 are continuous, the fusible portion 200 inside the housing 500 can be visually recognized through the viewing window 530 also from a viewpoint from a direction in which the upper surface wall 521 and the front surface wall 523 of the housing 500 intersect, that is, from a viewpoint from an obliquely upward angle (see an arrow E in FIG. 4(*b*)).

In addition, the upper end window 531 and the front window 532 of the viewing window 530 are arranged to face the front surface side of the inclined portion 215 of the fusible portion 200. Therefore, the welding portion 216 and the connecting portion 217 located at the inclined portion 215 can be easily viewed from the upper end window 531 or the front window 532, and the melting state of the low melting point metal on the welding portion 216 and the melting state of the connecting portion 217 can be easily confirmed.

Figure 5A:
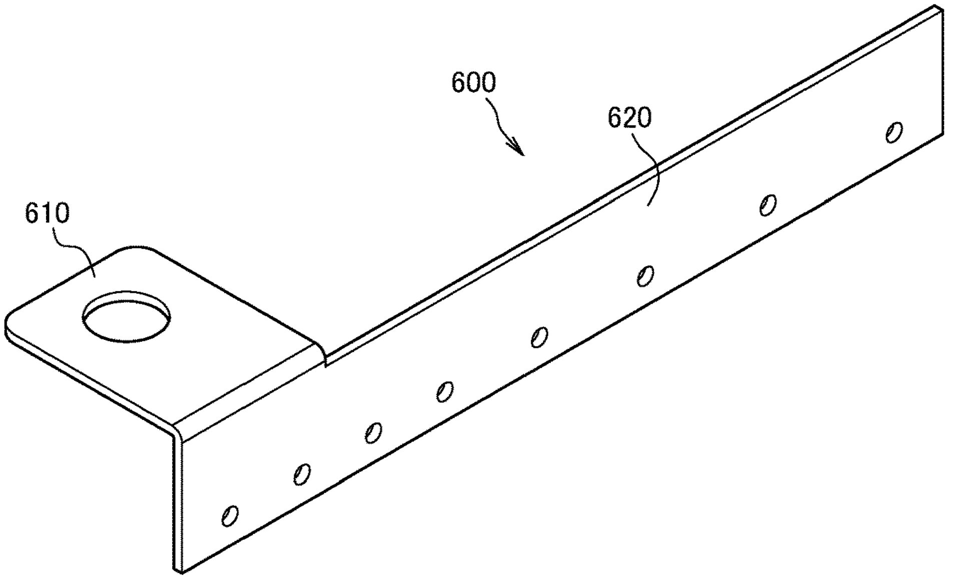
FIG. 5(*a*) is an overall perspective view of a bus bar portion, and FIG. 5(*b*) is an overall perspective view of a fuse.
Figure 5B:
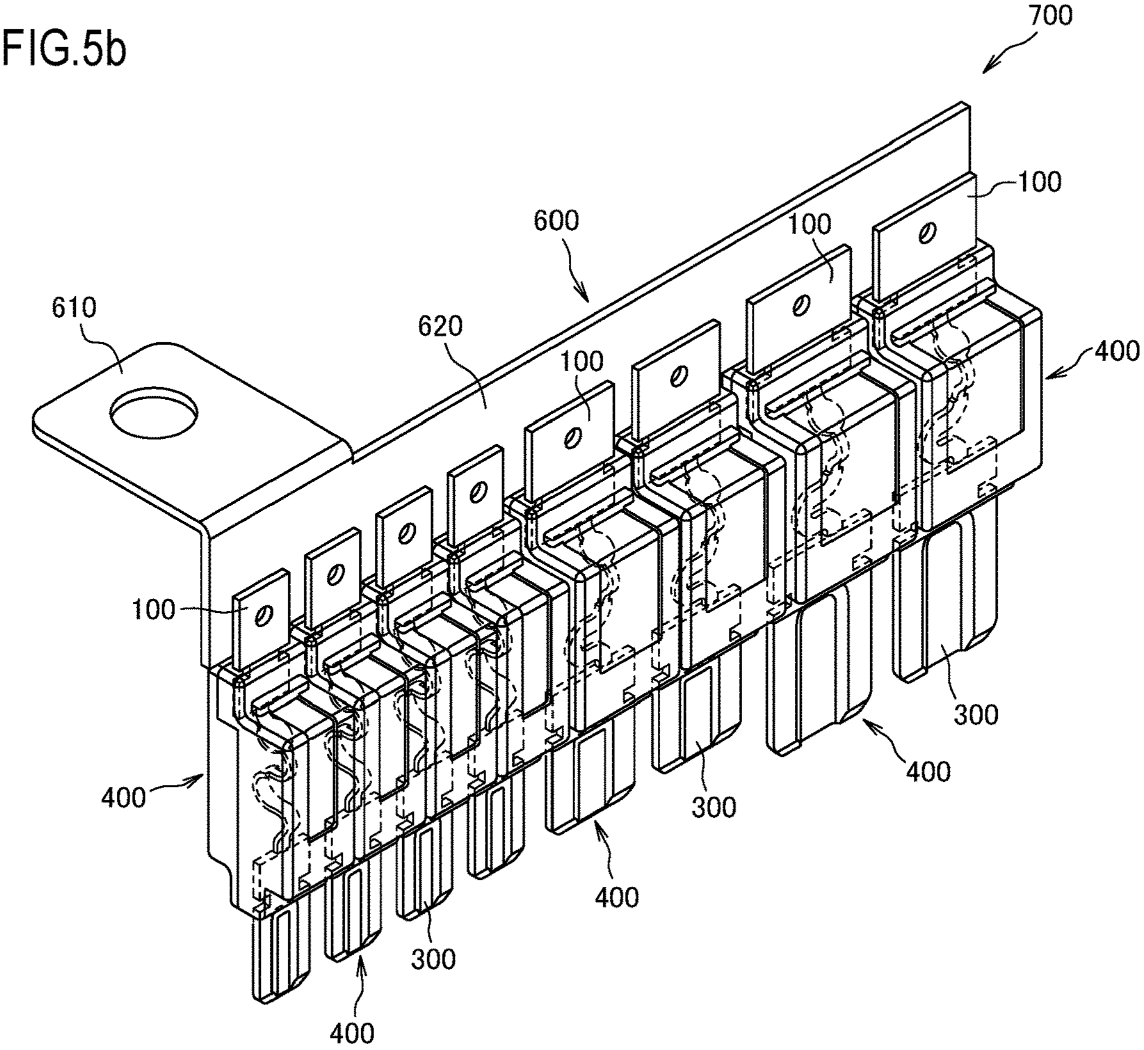

Next, a fuse 700 in which the fusible portion unit 400 is attached to a bus bar portion 600 will be described with reference to FIGS. 5 and 6. FIG. 5(*a*) is an overall perspective view of the bus bar portion 600, FIG. 5(*b*) is an overall perspective view of the fuse 700, FIG. 6(*a*) is a front view of the fuse 700, and FIG. 6(*b*) is a side view of the fuse 700.

As illustrated in FIG. 5(*a*), the bus bar portion 600 includes an input terminal portion 610 connected to a power source side such as a battery, and a long thin plate-shaped bus bar main body 620 to which the fusible portion unit 400 is attached. The input terminal portion 610 and the bus bar main body 620 of the bus bar portion 600 are integrally formed by punching a flat plate material having a uniform thickness made of a conductive metal such as copper or an alloy thereof into a shape as illustrated in FIG. 1 with a press machine or the like and then bending the input terminal portion 610.

Then, as illustrated in FIGS. 5(*b*) and 6, the plurality of fusible portion units 400 are individually attached to the bus bar main body 620 of the bus bar portion 600. Specifically, the coupling portion 100 of each of the fusible portion units 400 is provided at a predetermined attachment position of the bus bar main body 620, and the contact surface between the flat surface of the bus bar main body 620 and the coupling portion 100 is fixed by a method such as welding typified by solder to fix each of the fusible portion units 400 to the bus bar main body 620. The fusible portion units 400 are lined and fixed on the lower side of the bus bar main body 620 at predetermined intervals. Therefore, the fuse 700 including the fusible portion units 400 and the bus bar portion 600 is in the form of a multiple fuse including a plurality of terminal portions 300 on the lower side of the bus bar portion 600. Then, when the fuse 700 is mounted on an in-vehicle fuse box or the like, a current input from the input terminal portion 610 connected to a power source or the like such as a battery flows through the bus bar main body 620 and branches to each of the fusible portion units 400 on the downstream. Furthermore, a current flows through various electrical components connected to the terminal portion 300 of each fusible portion unit 400. If an unintended overcurrent flows in the electric circuit or the like, the fusible portions 200 of the corresponding fusible portion units 400 fuse to cut off the electric circuit, thereby protecting various electric components and the electric circuit.

Figure 6A:
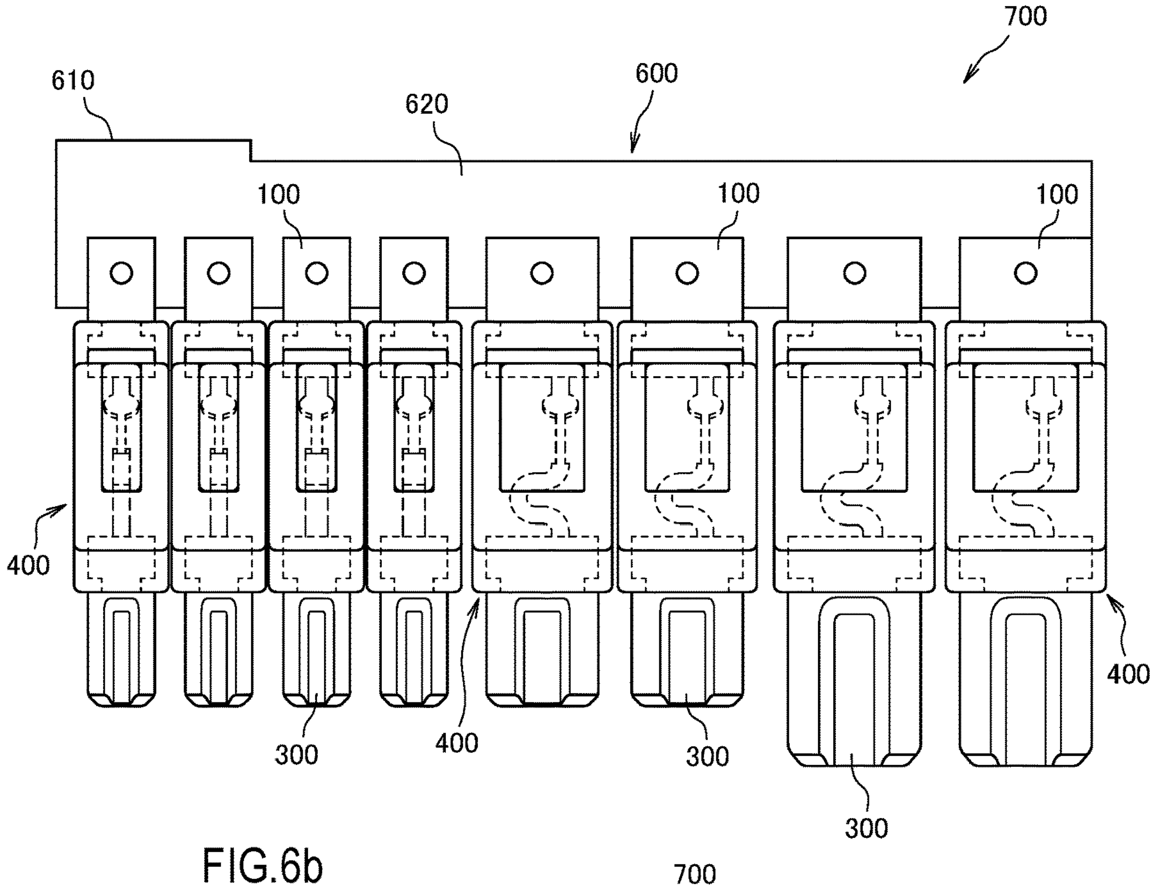
FIG. 6(*a*) is a front view of the fuse, and FIG. 6(*b*) is a side view of the fuse.
Figure 6B:
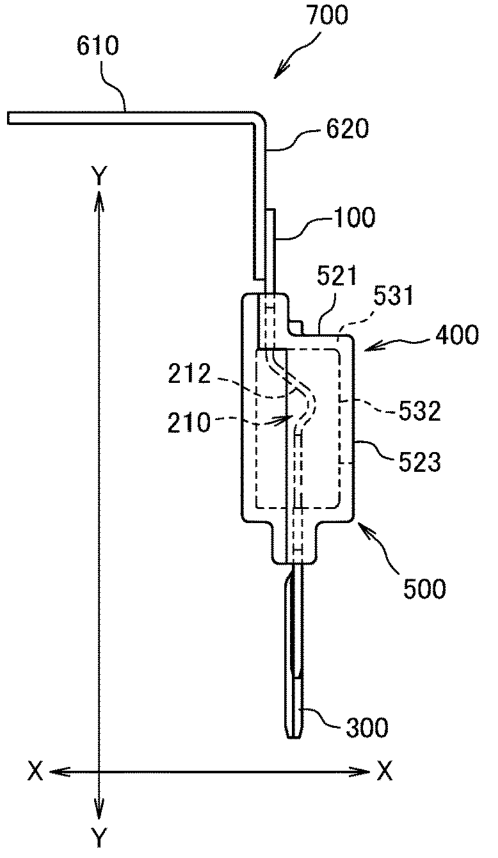

As illustrated in FIG. 6, when the fusible portion unit 400 is attached to the bus bar portion 600, the housing 500 of the fusible portion unit 400 protrudes from the bus bar portion 600. The upper surface wall 521 of the housing 500 protrudes from the bus bar portion 600 along the direction X that is also the thickness direction of the fuse 700, and the front surface wall 523 of the housing 500 extends along the direction Y that is also the height direction of the fuse 700.

As described above, according to the fuse 700 of the present invention, the fusible portion unit 400 including the terminal portion 300 and the fusible portion 200 is manufactured as a separate body from the bus bar portion 600, and each fusible portion unit 400 is individually attached to the bus bar portion 600. Therefore, when the shape of the fusible portion 200 is changed according to the rating, it is only necessary to separately prepare the fusible portion unit 400 in which the shape of the fusible portion 200 is changed and to replace and fix it to the busbar portion 600, and it is not necessary to change the other fusible portion units 400 and the busbar portion 600. That is, in the present invention, since the fusible portion 200, the terminal portion 300, and the bus bar portion 600 are not integrally formed from one metal plate as in the prior art, even if the shape of the fusible portion 200 is changed according to the rating, the influence of the design change is limited to the fusible portion unit 400 including the fusible portion 200, and does not affect the other fusible portion units 400 and the bus bar portion 600. Therefore, when the rating is changed, a desired fuse 700 can be easily manufactured in a short period of time by simply preparing fusible portion units 400 with different ratings and attaching the same to the bus bar portion 600. Even in a case complying with a wide variety of specifications required for the fuse 700 (e.g., a change in the number and size of the terminal portions 300, a change in the shape of the bus bar portion 600, etc.), the desired fuse 700 can be easily manufactured in a short period of time by merely individually replacing and changing the fusible portion unit 400 and the bus bar portion 600 according to the specifications. Furthermore, by manufacturing the fusible portion unit 400 including the fusible portion 200 whose shape is changed as a separate body from the bus bar portion 600, the fusible portion unit 400 and the bus bar portion 600 can be individually designed to optimal shapes, respectively, and the yield is improved as a whole.

In addition, since the fusible portion unit 400 including the terminal portion 300 and the fusible portion 200 is manufactured as a separate body from the bus bar portion 600, a metal material having a relatively high resistance value can be used for the portion constituting the fusible portion 200 in order to secure the fusing performance, and a metal material having a relatively low resistance value can be used for the bus bar portion 600 having a role of distributing the current to each fusible portion unit 400 in order to efficiently flow the current.

In addition, since each of the fusible portion units 400 is configured as a separate body from the other fusible portion units 400 and the bus bar portion 600, fine processing of the fusible portion 200 of the fusible portion unit 400 as illustrated in FIG. 1 can be easily performed. Specifically, as illustrated in FIGS. 1 and 6, when the rating of the fusible portion 200 is changed, a fine process of forming the bent curved portion 212 such that a part of the fusible portion 200 contracts in the height direction Y and protrudes from the surface of the bus bar main body 620 (or the surface of the coupling portion 100) can be easily performed for each fusible portion unit 400. Accordingly, since the fusible portion 200 is configured to contract in the height direction Y as a whole, the size in the height direction Y can be prevented from increasing even if the rating is changed.

In particular, since the size in the height direction Y can be adjusted by adjusting the degree of bending of the curved portion 212, the height of each of the fusible portion units 400 having different ratings can be aligned.

Figure 7A:
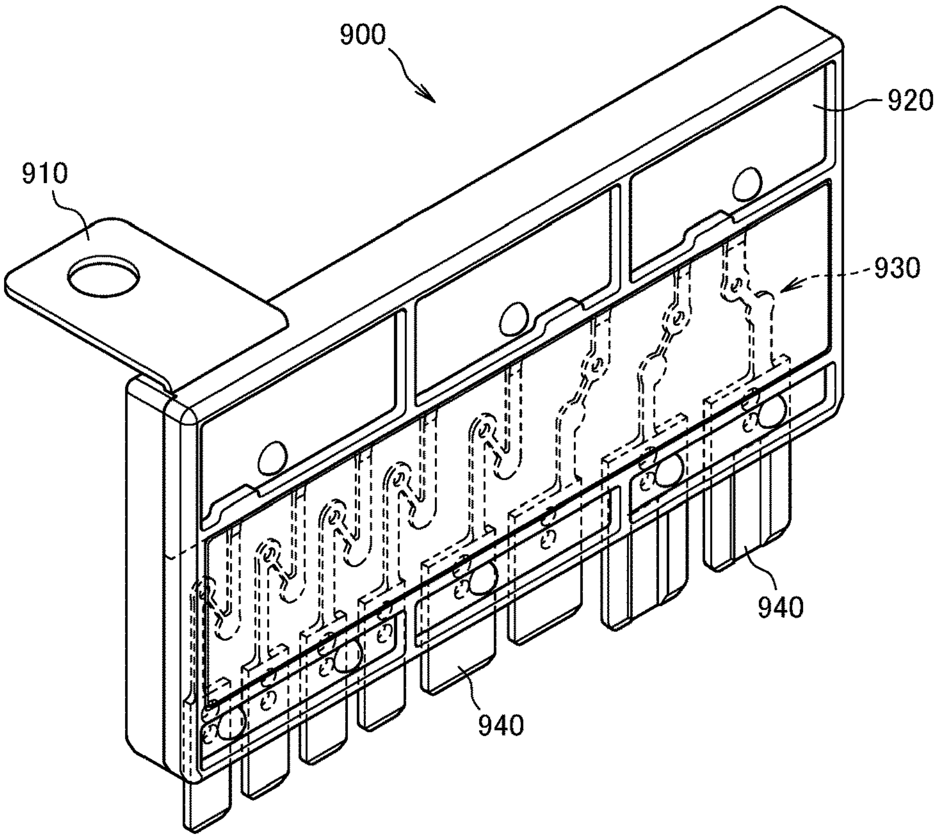
FIG. 7(*a*) is an overall perspective view of a fuse according to a conventional technique, and FIG. 7(*b*) is a front view of the fuse.
Figure 7B:
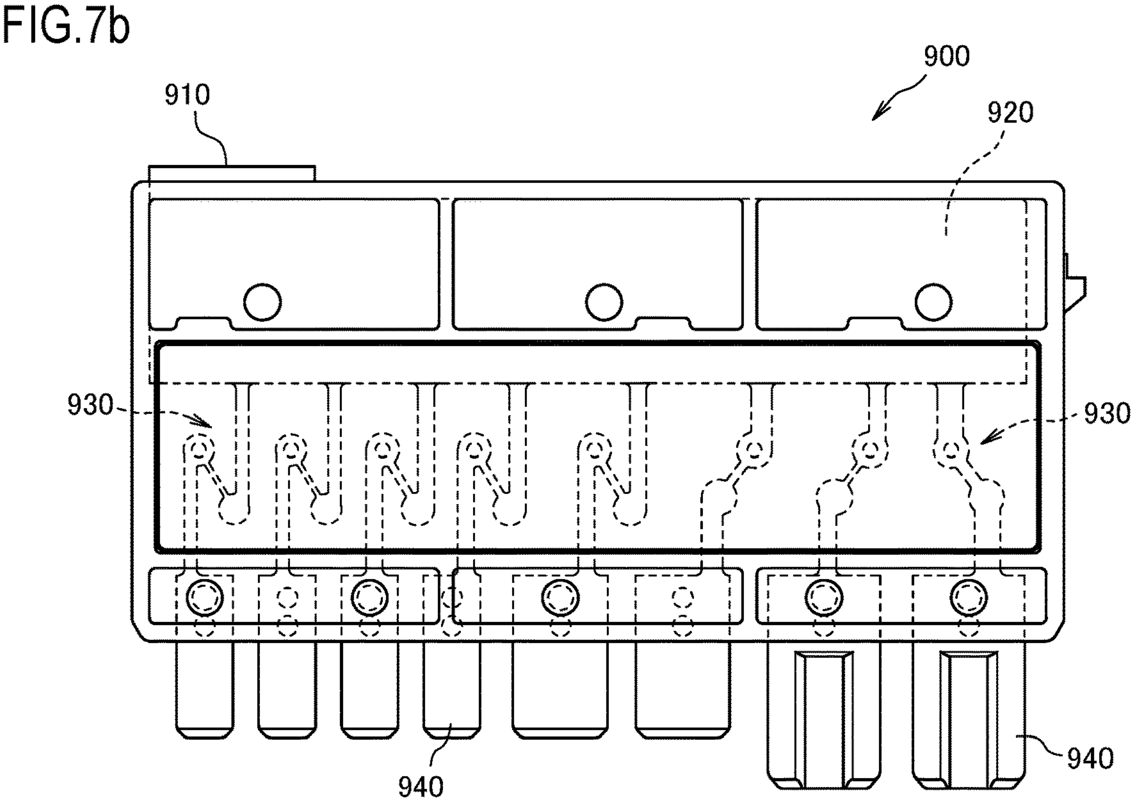

Furthermore, since a part of the fusible portion 200 is configured to contract in the height direction Y of the fuse 700 and protrude from the surface of the bus bar portion 600 (or the surface of the coupling portion 100), whether or not the fusible portion 200 is fused can be easily confirmed. As illustrated in FIG. 7, since the fusible portion 930 of the conventional fuse 900 linearly extends in the height direction of the fuse 900, the fusible portion 930 is hidden by the bus bar portion 920 from above, and it is difficult to visually confirm the fusible portion 930. Furthermore, when a plurality of fuses 900 are arranged side by side in a fuse box or the like, the fusible portion 930 is blocked by another adjacent fuse 900, and it becomes difficult to confirm the fusible portion 930 from the upward direction or obliquely upper side. However, according to the present invention, as illustrated in FIG. 4, since a part of the fusible portion 200 is configured to contract in the height direction Y and to protrude from the surface of the bus bar portion 600 (or the surface of the coupling portion 100), even if the plurality of fuses 700 are arranged side by side in a fuse box or the like, the fusible portion 200 can be visually confirmed from an upward or obliquely upward viewpoint (see arrow E), so that whether or not the fusible portion 200 has fused can be easily confirmed.

Even when the fusible portion unit 400 includes the housing 500 that protects the fusible portion 200, the housing 500 protrudes from the flat surface of the bus bar main body 620 of the bus bar portion 600, and the upper surface wall 521 of the housing 500 includes the viewing window 530 (upper end window 531) through which the fusible portion 200 inside can be viewed, so that whether or not the fusible portion 200 has fused can be easily confirmed from above. Furthermore, since the viewing window 530 (front window 532) extends to the front surface wall 523 of the housing 500, whether or not the fusible portion 200 has fused can be easily confirmed even from the upward direction and the obliquely upper side. Each of the fusible portion units 400 includes the housing 500 having the viewing window 530, but is not limited thereto, and for example, the fuse 700 may include a housing that covers the bus bar portion 600 and each of the fusible portion units 400 similarly to the conventional fuse 900 illustrated in FIG. 7, and the housing may include the viewing window 530 at a position corresponding to the fusible portion 200 of each of the fusible portion units 400.

The fuse according to the present invention is not limited to the example described above, and various modifications and combinations are possible within the scope of the claims and the scope of the embodiments, and these modifications and combinations are also included in the scope of rights.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A fuse comprising an input terminal portion, a bus bar portion through which a current input from the input terminal portion flows, and a terminal portion connected to the bus bar portion through a fusible portion, wherein a fusible portion unit including the fusible portion and the terminal portion is provided in plurals;

each of the fusible portion units is a separate body from the bus bar portion and is individually attached to the bus bar portion;

the fusible portion of the fusible portion unit extends in a height direction connecting the terminal portion and the bus bar portion;

a part of the fusible portion is bent so as to contract in the height direction and protrude from a surface of the bus bar portion; and the upper end and the lower end of the fusible portion are arranged shifted from each other in the direction orthogonal to the height direction.

2. The fuse according to claim 1, wherein the fusible portion unit includes a housing that accommodates the fusible portion, the housing protrudes from a surface of the bus bar portion, and a viewing window through which the fusible portion inside is viewable is formed on an upper surface wall of the housing.

3. The fuse according to claim 2, wherein the viewing window extends from an upper surface wall to a front surface wall of the housing.

* * * * *